US005768604A

United States Patent [19]

Yamazaki et al.

[11] Patent Number: 5,768,604

[45] Date of Patent: Jun. 16, 1998

[54] POWER SAVING COMPUTER SYSTEM AND METHOD WITH POWER SAVING STATE INHIBITING

[75] Inventors: Satoshi Yamazaki, Sagamihara; Takeshi Ishimoto, Kawasaki; Tsutomu Kigoshi, Sagamihara, all of Japan

[73] Assignee: International Business Machines Corp., Armonk, N.Y.

[21] Appl. No.: 723,633

[22] Filed: Oct. 3, 1996

[30] Foreign Application Priority Data

Oct. 20, 1995 [JP] Japan ........................ 7-272483

[51] Int. Cl.[6] ........................ G06F 1/32

[52] U.S. Cl. ........................ 395/750.05; 395/750.07

[58] Field of Search ........................ 395/750.05, 750.07, 395/750.03

[56] References Cited

U.S. PATENT DOCUMENTS 5,396,635 3/1995 Fung ........................ 395/750.05

*Primary Examiner*—Jack B. Harvey
*Assistant Examiner*—Jeffrey K. Sato
*Attorney, Agent, or Firm*—Daniel E. McConnell

[57] ABSTRACT

A computer system, which shifts a mode to a power saving mode when there is no user input at a keyboard for a predetermined time period, employs a circuit for detecting writing to a video memory, and a power management program for managing power in corporation with the circuit. When the writing to a video memory is performed, a shift to the power saving mode is inhibited, even though there is no input at the keyboard during the predetermined time period.

9 Claims, 8 Drawing Sheets

71 Entrance
72 Set timer value to initial value
73 Input at keyboard ?
Yes
74 Reset timer value
No
75 Video memory write bit ON ?
Yes
No
76 Increment timer value
77 Timer value > specified value ?
No
Yes
78 Shift to standby mode
79 Exit

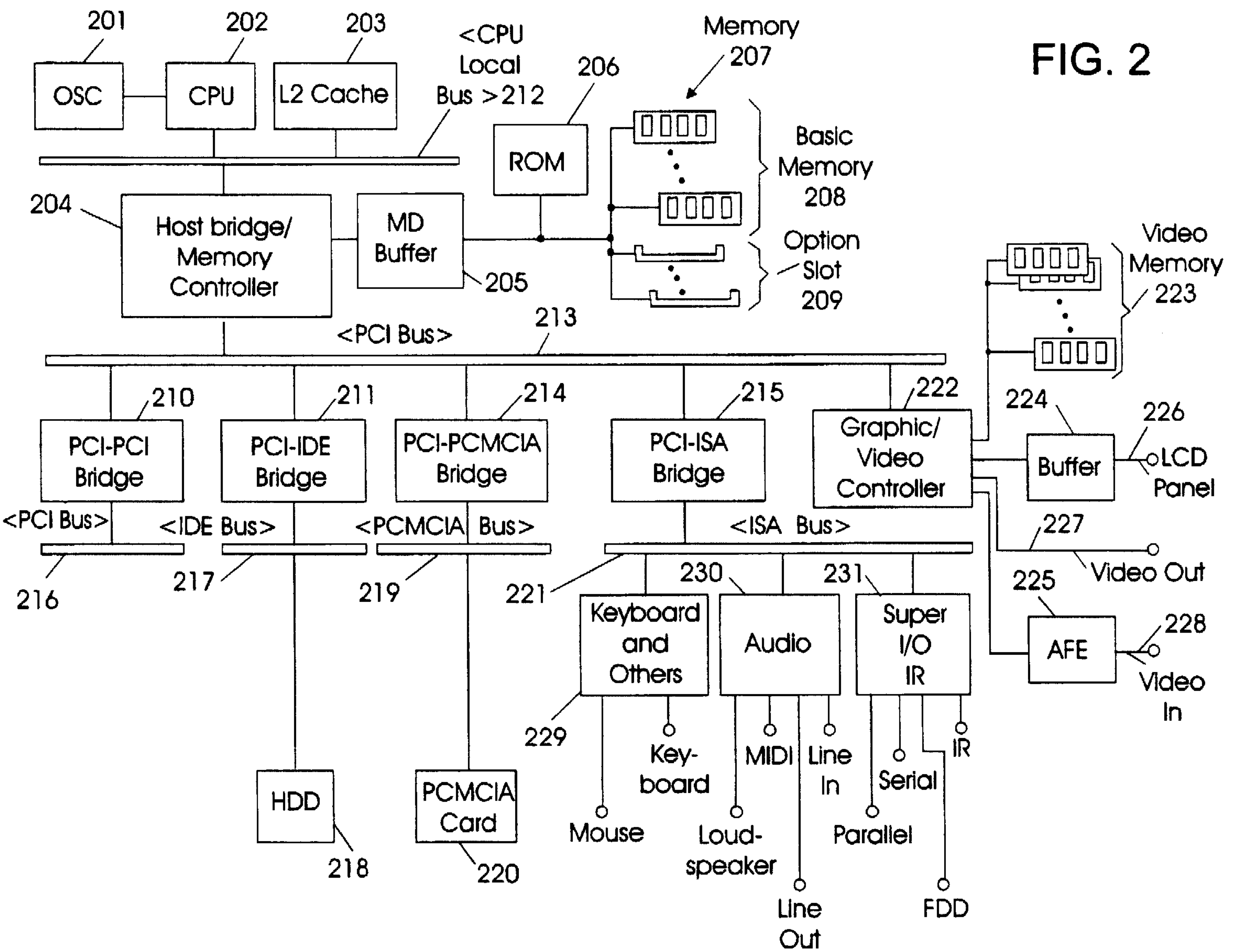
FIG. 2
201
OSC
202
CPU
203
L2 Cache
<CPU Local Bus >212
206
ROM
Memory 207
Basic Memory 208
Option Slot 209
204
Host bridge/ Memory Controller
MD Buffer
205
<PCI Bus>
213
210
PCI-PCI Bridge
211
PCI-IDE Bridge
214
PCI-PCMCIA Bridge
215
PCI-ISA Bridge
222
Graphic/ Video Controller
Video Memory 223
224
Buffer
226
LCD Panel
227
Video Out
225
AFE
228
Video In
<PCI Bus>
216
<IDE Bus>
217
<PCMCIA Bus>
219
<ISA Bus>
221
230
231
Keyboard and Others
Audio
Super I/O IR
229
Key-board
MIDI
Line In
Serial
IR
Mouse
Loud-speaker
Parallel
Line Out
FDD
HDD
218
PCMCIA Card
220

401
Normal
(ON)
412
Password
OK
412
Power
SW
406
Timer
407
Key
Input
408
Suspend
SW, Utility
410
405
Standby
-LCD/CRT Off
Password
input
402
Timer,
utility
409
Key Input,
Suspend SW
411
Suspend
-LCD/CRT Off
-CPU, HDD, Video Off
403
Off
404

51
Entrance
52
Set timer value to initial value
53
Input at keyboard ?
Yes
54
Reset timer value
No
55
Increment timer value
56
Timer value > specified value ?
No
Yes
57
Shift to standby mode
58
Exit Video Memory Write Bit
607
603
608
601
+5V
611
PS
Q
Q̄
D
CLR
602
606
604
605
610
WE#
Reset #
Status Clear #
Status Read #

71
Entrance
72
Set timer value to initial value
73
Input at keyboard ?
Yes
74
Reset timer value
No
75
Video memory write bit ON ?
Yes
No
76
Increment timer value
77
Timer value > specified value ?
No
Yes
78
Shift to standby mode
79
Exit 801
Standby Request 812
Standby Request 813
Key Input 811
802
Power Management
Time Out
803
VRAM Writing 815
Key Input 814
Event Timer
OS
821
Device Driver
Keyboard D/D
804
817
Graphics D/D
806
Key input
818
LCD/CRT Off Request
822
Hardware
Key input 816
LCD/ CRT
Graphics controller
808
Keyboard
805
807
VRAM Writing
819
VRAM
809
VRAM Writing
820
810
External Video Input

POWER SAVING COMPUTER SYSTEM AND METHOD WITH POWER SAVING STATE INHIBITING

BACKGROUND OF THE INVENTION

The present invention relates to a power management function for a computer system, and in particular, to an apparatus and a method for entering a power management mode when there has been no input during a specified period.

Currently, from the view point of power saving, it is important for notebook computers and other types of personal computers to have a power saving function provided by power management that is consonant with the condition under which a computer is operated by a user.

A conventional power saving function utilizes "depression of a power saving button", or "no input at a keyboard, etc., for a predetermined time" as a trigger (condition or an event) for shifting from a common power-on state to a power saving mode.

Since the "depression of a power saving button" requires extra user manipulation, it requires more human effort. But although the "no input at a keyboard, etc., for a predetermined period" is better than the "depression of a power saving button", because it does not require extra user manipulation, problems arise with this approach.

When an animated graphic display from a CD-ROM, etc., is being reproduced on a screen, a user will desire to watch the screen, even though he or she does not enter any key input, but because of the trigger, the display will disappear if keyboard input is not performed within a predetermined period.

To resolve this problem, a user has to provide useless input at a keyboard within a time period that is shorter than a predetermined time, or has to inhibit the power saving function.

The "useless keyboard input" and the "disable of the power saving function" are contradictory to the provision of a power saving function available for a user, and the means taken to achieve the end is less than optimal.

Japanese Patent Application No. Hei 5-214174, submitted by Mitsubishi Electric Corporation, discloses an apparatus that employs, as a trigger (condition) for shifting to a conventional power managing function, whether or not writing to a display memory is performed. This apparatus is similar to the present invention in that a normal power-on state is shifted to a power saving mode in response to the detection of a specified trigger. This apparatus, however, only uses the presence or the absence of writing to the display memory to shift from the normal power-on state to the power saving mode, and triggers and functions for inhibiting the mode shift are not described. Thus, for an application that does not perform screen writing, the inability to shift to the power saving mode, as in the conventional case, is a problem that can not be avoided.

SUMMARY OF THE INVENTION

It is one purpose of the present invention to provide a more usable power management function, for a personal computer, that inhibits an unnecessary shift from a normal power-on state to a power saving mode. In achieving this purpose, the present invention provides, for a computer system which has at least one power saving mode in addition to a power-on state and a power-off state, a new power saving function. The new function, which reduces the shifting to a power saving mode that conventionally occurs when a user does not anticipate the shifting, is provided by employing an apparatus or a method, which has a first trigger condition for determining a shift from the power-on state to the power-off state, and a second trigger condition employed when the first trigger condition is established, with which, when the second trigger condition is not established after the first trigger condition has been established, the operation is returned for a determination of the first trigger condition, or with which, when the second trigger condition is established after the first trigger condition has been established, an operational mode is shifted to a power-saving mode.

BRIEF DESCRIPTION OF THE DRAWINGS

Some of the purposes of the invention having been stated, others will appear as the description proceeds, when taken in connection with the accompanying drawings, in which:

FIG. 2 is a block diagram illustrating a logical circuit incorporated in the computer system for carrying out the present invention;

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

For the sake of convenience, a notebook personal computer, for which a power saving function would probably be employed most frequently, is employed in the following embodiment. The application of the present invention, however, is not limited to notebook personal computers, and can be applied for computer systems of various types, such as desktop and floor-standing models.

Figure 1:
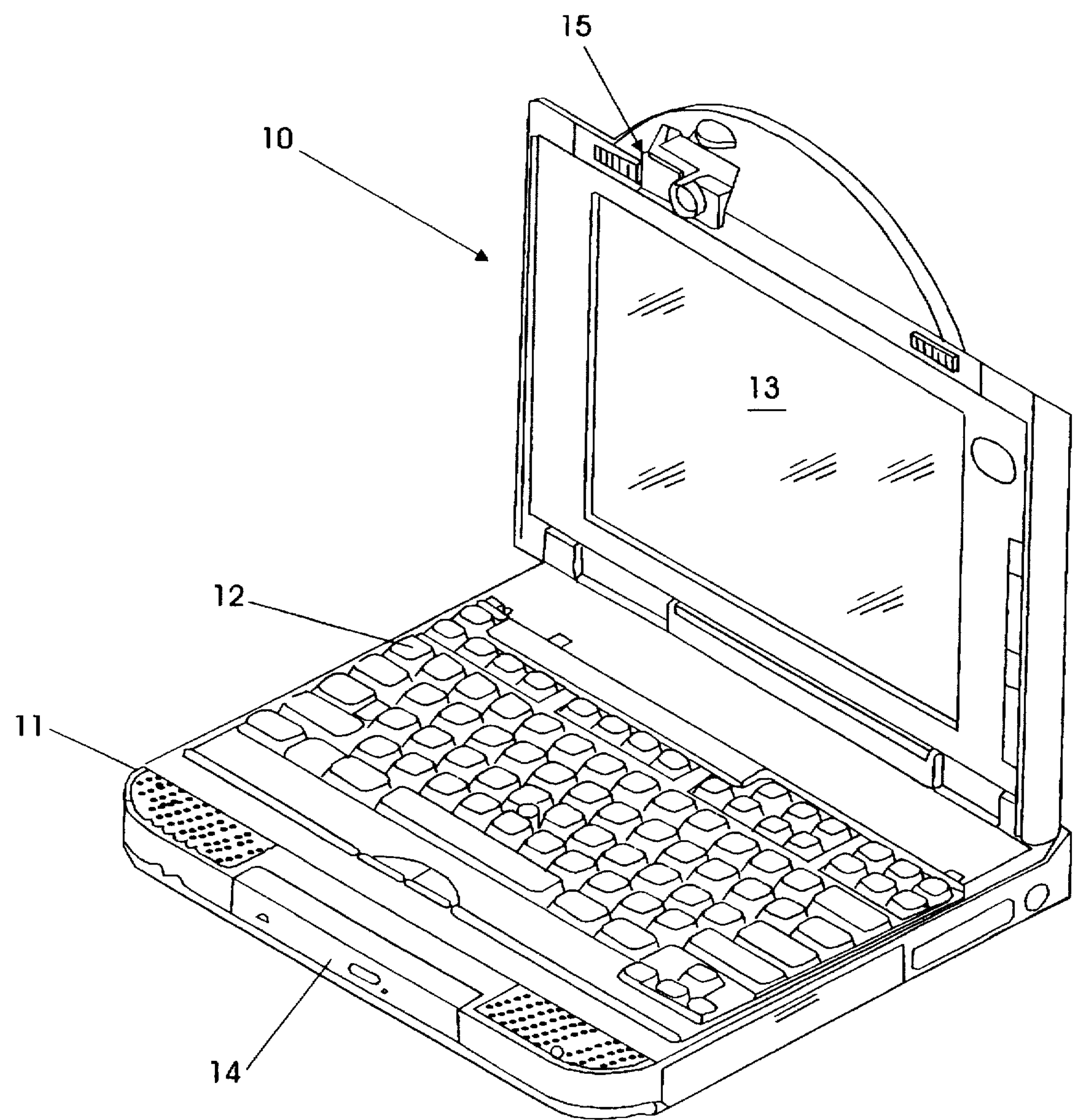
FIG. 1 is a diagram illustrating a computer system for carrying out the present invention.

In FIG. 1 is shown the general appearance of a computer system for carrying out the present invention. A main body 10 of the computer system is preferably a portable PC (personal computer) as is shown; however, it can also be a desktop or another type of PC, or a workstation. The computer system 10 comprises, as standard components, a keyboard 12 that serves as an input device for characters, etc.; a liquid crystal panel 13 that serves as an output device for characters and graphics, etc.; a CD-ROM drive 14 that serves as a memory medium having a large capacity; and a loudspeaker 11 that serves as an output device for sounds. Some computer systems 10 also include as a standard component a video camera 15 that serves as an image input device. The details of the keyboard 12 and the liquid crystal panel 13 are not shown because they are not directly related to the configuration of the present invention.

FIG. 2 is a block diagram illustrating a logical circuit, which is normally located on a motherboard (planar board) inside the notebook computer in FIG. 1. In current personal computer systems, a motherboard has a plurality of buses to which devices of various processing speeds are connected, and a circuit, called a bus bridge, that performs protocol exchanges between buses and communicates with the buses. As a specific example of a bus structure, in FIG. 2 are shown a CPU local bus 212 that is directly connected to a CPU 202; PCI buses 213 and 216 to which peripheral devices having comparatively high processing speeds are connected; and an ISA bus 221, a PCMCIA bus 219 and an IDE bus 217 to which peripheral devices having comparatively low processing speeds are connected.

In FIG. 2 are also shown a host bridge/memory controller 204 that connects the CPU bus 212 to the PCI bus 213; a PCI-ISA bus bridge circuit 215 that connects the PCI bus 213 and the ISA bus 221; and a PCI-PCMCIA bus bridge circuit 214 that connects the PCI bus 213 to the PCMCIA bus 219.

Further, a plurality of peripheral devices are connected to the buses in consonance with the processing speeds of the buses. For example, a CPU is connected to the CPU local bus 212 having the highest processing speed, as is indicated by its name. A high speed graphic/video controller 222 is connected to the PCI bus 213. A keyboard controller 229, an audio controller 230 and a Super I/O controller 231, which is a general-purpose I/O controller, are connected to the ISA bus 221.

The host bridge/memory controller 204 has a memory control function in addition to the bus bridge function, and is connected to a BIOS ROM 206 and a main memory RAM 207 via a memory data buffer 205.

The graphic/video controller 222, which is connected to the PCI bus 213, has a screen display video memory 223. The graphic/video controller 222 is connected to an LCD panel via a buffer 224 by using a digital signal, and digitizes an analog video input from the outside via an analog front end (AFE) 225 and fetches the digital input.

Figure 3:
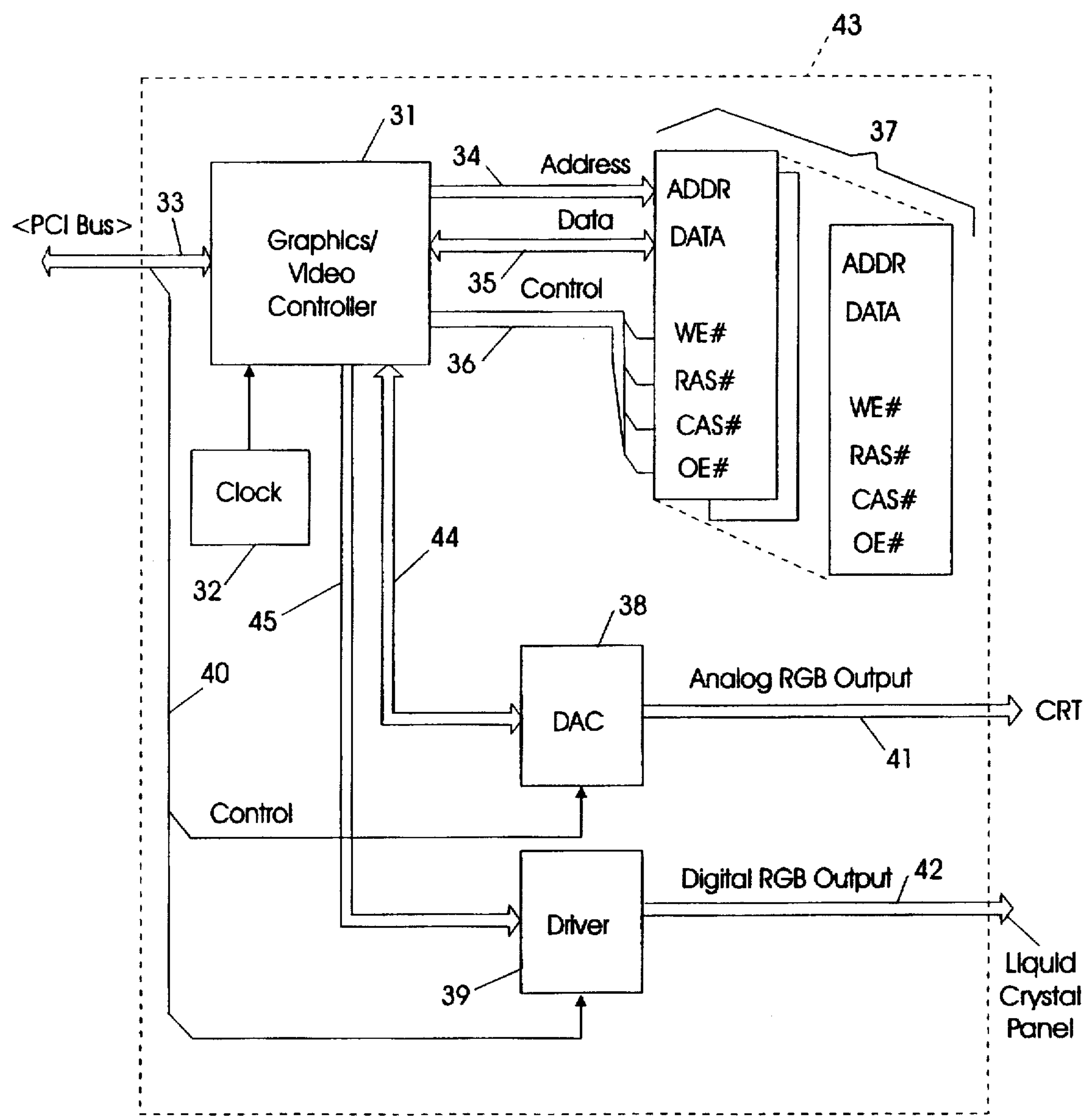
FIG. 3 is a block diagram illustrating a graphics peripheral circuit incorporated in the computer system for carrying out the present invention.

FIG. 3 is a detailed diagram illustrating the graphics video controller 222 in FIG. 2 and its peripheral circuits. In FIG. 3 are shown, as the essential components, a graphics video controller 31 for controlling graphics video related functions; a clock generator 32 for generating a clock signal that is to be transmitted to the graphics video controller 31; a plurality of video memories 37 in which screen information, etc., are stored; a DAC 38 for converting into an analog video signal 41 a digital video signal 44, which is generated by the graphics video controller 31; and a driver 39 for buffering a digital video signal 45 that is generated by the graphics/video controller 31 and for transmitting a resultant digital signal 42 to the liquid crystal panel.

The graphics video controller 31 and the video memory 37 are connected to each other by a plurality of address lines 34 that are employed to indicate memory positions in the memory, a plurality of data lines 35 that are employed to transfer data for reading/writing, and a plurality of control lines 36 that are employed to control the operation of the video memory 37. The control lines 36 carry a write enable signal (WE#) to the video memory 37, a row address strobe signal (RAS#), a column address strobe signal (CAS#), and an output enable signal (OE#), for data from the video memory 37.

Figure 4:
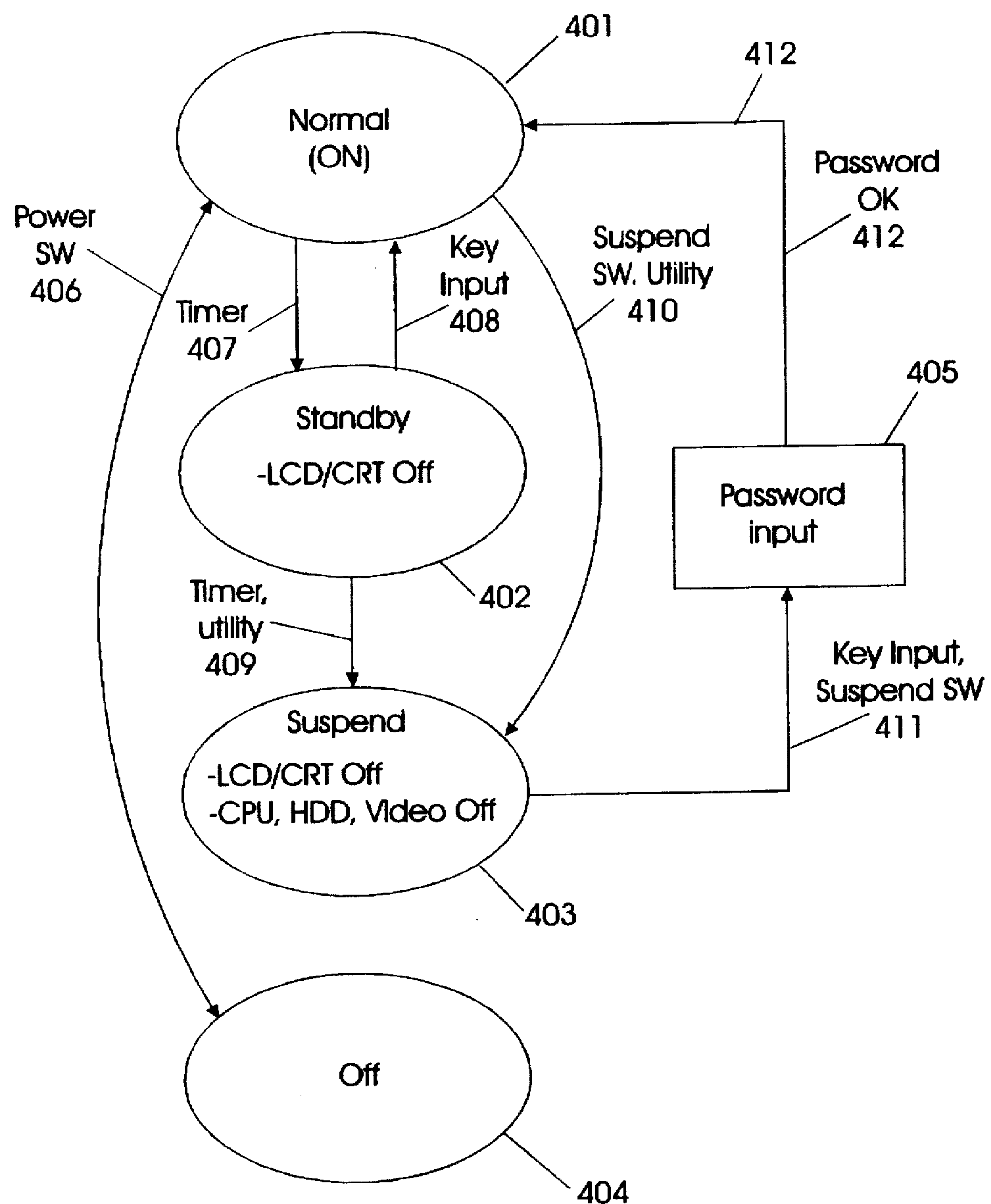
FIG. 4 is a diagram showing the shifting of power-on states for carrying out the present invention.

In FIG. 4 is shown the shifting of a power-on state. A general personal computer that has a power saving function has several "power-saving states", in addition to the common "power-on state" and "power-off state". In FIG. 4, the "standby state" and the "suspend state" are shown as example "power saving states". A difference between the "standby state" and the "suspend state" is the difference in the degree of power saving, i.e., a difference in the power consumed. The power consumption becomes smaller following the order the "normal power-on state", the "standby state", the "suspend state", and the "power-off state". Although two or more states can be classified as "power saving states", the number of power saving states in this embodiment is limited to two for simplification of the explanation.

A "standby state" 402, for example, is intended to save power by turning off a liquid crystal display panel (LCD) and a CRT display. In a "suspend state" 403, in addition to turning off the liquid crystal display panel and the CRT display, the clock frequency of a CPU is reduced, a spindle motor for a hard disk is halted, and transmission of a video signal is halted, so that the power that is saved is greater than that in the "standby state" 402.

The "normal power-on (normal on) state" is shown in a block 401 in FIG. 4. The "normal on state" is shifted to the "standby state" 402 after a predetermined timing period has elapsed (407). When there is an input at a keyboard, or with the use of a mouse (408), the "standby state" 402 is shifted to the "normal on state".

The "standby state" 402 is shifted to the "suspend state" 403 when a predetermined timing period has elapsed, or by a utility program 409. The "suspend state" 403 is shifted to the next block 405 by using, as a trigger, keyboard input or a special suspend switch (SW) 411. At the block 405, input of a password is requested, and when a correct password is input (412), the state is shifted to the "normal on"state.

When, in the "normal on state" 401, a power switch (SW) is depressed (406), the "normal on state" 401 is shifted to a "power-off state" 404. When, in the "power-off state" 404, the power switch (SW) is depressed (406), the "power-off state" 404 is shifted to the "power-on state" 401, and a personal computer is returned to a normal operating mode.

Figure 5:
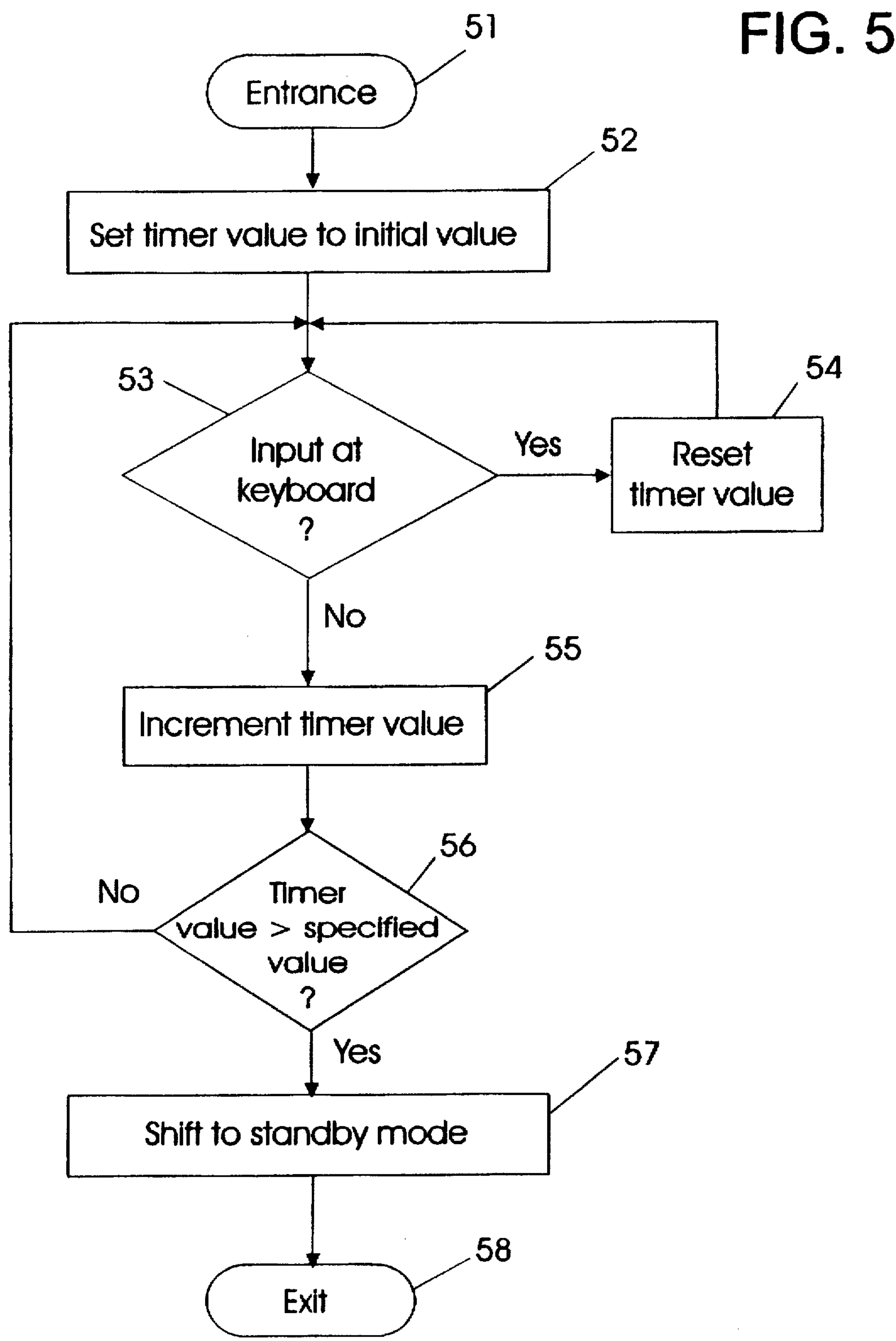
FIG. 5 is a flowchart for a conventional control program for controlling a power saving function.

FIG. 5 is a flowchart of the processing, performed by a personal computer having the power saving states that are shifted as is shown in FIG. 4, for shifting the "normal on state" to the "standby state".

Program control enters this sub-routine at block 51. First, at block 52, a timing value is cleared (the timing value is set to an initial value). The timer is employed to measure a period that elapses from the time of the last input by a user using a keyboard or a mouse until the next user input is effected. At block 53, a check is performed to determine whether or not there has been user input at a keyboard. If, at block 53, there has been user input, program control moves to block 54, whereat a timer value is reset, and then returns to block 53. If, at block 53, there has been no user input at the keyboard, the timing value that specifies an elapsed time period is incremented (block 55), and program control advances to block 56. At block 56, a check is performed to determine whether or not the timing value exceeds a predetermined value, i.e., a time-out value. When, at block 56, the timing value exceeds the predetermined value, program control advances to block 57. When the timing value does not exceed it, program control returns to block 53. At block 57, a process for shifting to the standby mode is performed, and the mode is then shifted to the standby mode. Finally, at block 58, program control exits from the sub-routine.

The present invention will now be described in detail while referring to FIGS. 6 through 8. FIG. 7 is a flowchart of the processing for the present invention with respect to the conventional processing in FIG. 5, for shifting the "normal on state" to the "standby state", performed by a personal computer.

Program control enters this sub-routine at block 71. First, at block 72, a timing value is cleared. The timer is employed to measure a period that elapses from the time of the last input by a user using a keyboard or a mouse until the next user input is effected. At block 73, a check is performed to determine whether or not there has been user input at a keyboard. If, at block 73, it is found there has been user input, program control moves to block 74, wherein a timing value is reset, and then returns to block 73. If, at block 73, there has been no user input at the keyboard, program control moves to block 75. At block 75, a check is performed to determine whether or not a video memory write bit is ON. The video memory write bit indicates whether writing to a screen display video memory (37 in FIG. 3) has been performed after the reading of the preceding bit. The details concerning this will be explained later while referring to FIG. 6. When, as a result of the check at block 75, the bit is found to be ON, i.e., the writing to the video memory has been performed, program control goes to block 74, whereat the timing value is reset. Therefore, although conventionally the mode is shifted to the standby mode, in this embodiment the shifting to the standby mode is inhibited by the writing to a video memory.

When, at block 75, the writing to the memory is not performed, program control advances to block 76. The timing value that indicates an elapsed time period is incremented, and program control advances to block 77. At block 77, a check is performed to determine whether or not the timing value exceeds a predetermined value, i.e., a time-out value. When, at block 77, the timing value exceeds the predetermined value, program control advances to block 78. When the timing value does not exceed the predetermined value, program control returns to block 73. At block 78, a process for shifting to the standby mode is performed and the mode is then shifted to the standby mode. Finally, at block 79, program control exits from the sub routine.

Hardware components required for the configuration of the present invention will now be described while referring to FIG. 6. Shown in FIG. 6 is an example circuit for providing a video memory write bit, which is employed in the explanation for FIG. 7. The essential component of the circuit is a one-bit register 601. Actually employed as the register 601 is a D flip-flop (for example, 74) with preset and clear functions. Since the preset input is always pulled up higher (+5 V) than a pull-up resistor 611, the preset function is not activated. Similarly, as input data D is pulled high by the pull-up resistor 611, input data is constantly 1. Thus, when WE# (all the signals with # at the end are active low) goes active (low), output Q608 of the flip-flop 601 is rendered active (high). The output Q608 is transmitted via a driver 603 to generate a video memory write bit signal (VIDEO MEMORY WRITE BIT). The output of the driver 603 is controlled by a status reading signal (STATUS READ#), and only when the status reading signal is active (low) is the output of the driver 603 generated and can the CPU read a video memory write bit 607.

The output terminal of an AND gate 602 is connected to a clear input terminal of the flip-flop 601. A reset signal (RESET#) 605 and a status clear signal (STATUS CLEAR#) 610 are sent to the AND gate. More specifically, when either the reset signal 605 or the status clear signal 610 becomes active (low), the AND gate 602 output goes low and clears the flip-flop 601. The video memory write bit is cleared via the AND gate 602 by a reset signal 605 in the reset state, such as the power-on state, or by the status clear signal 610 when the video memory write bit has been read.

Figure 6:
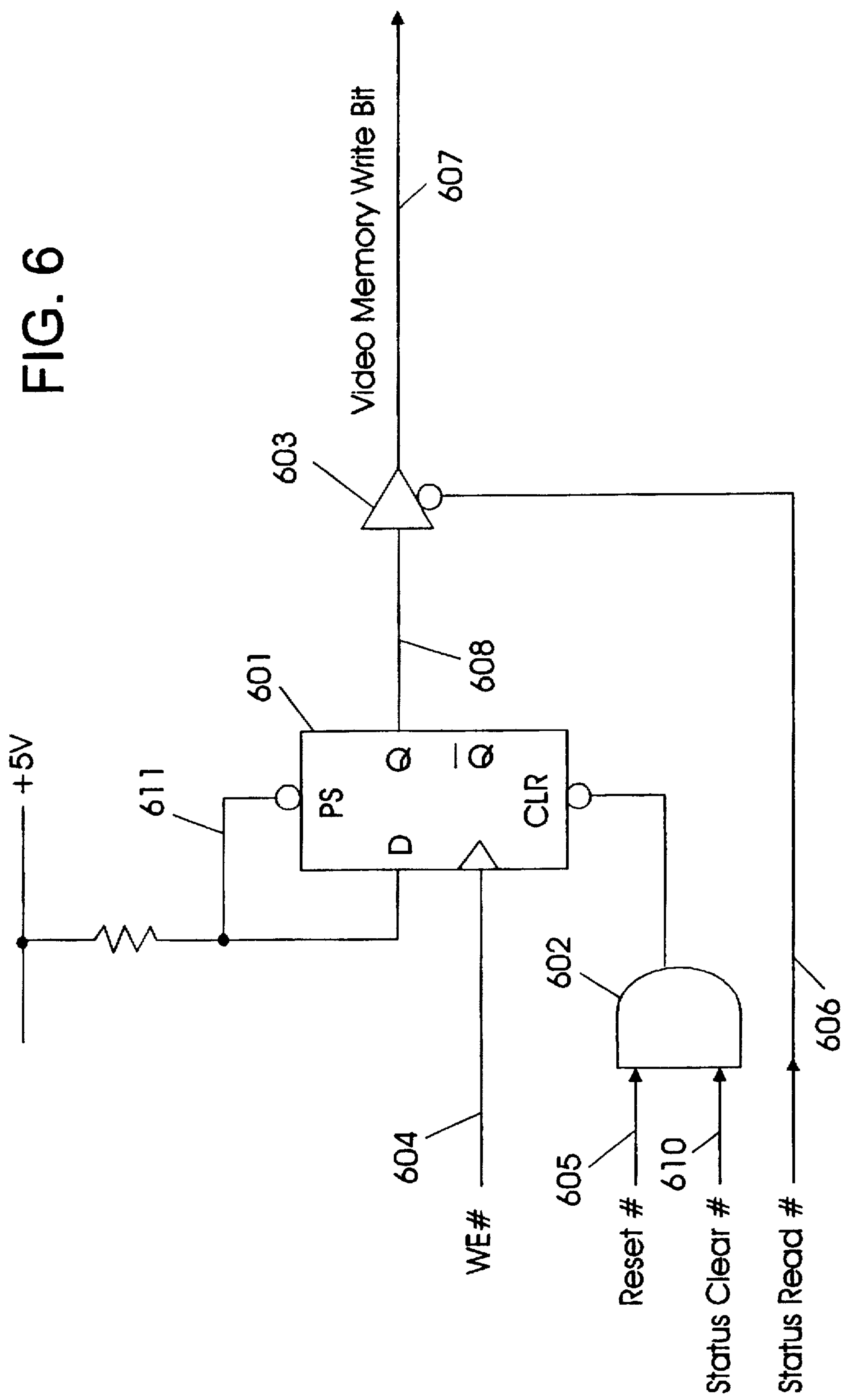
FIG. 6 is a circuit diagram showing a register for carrying out the present invention.
Figure 7:
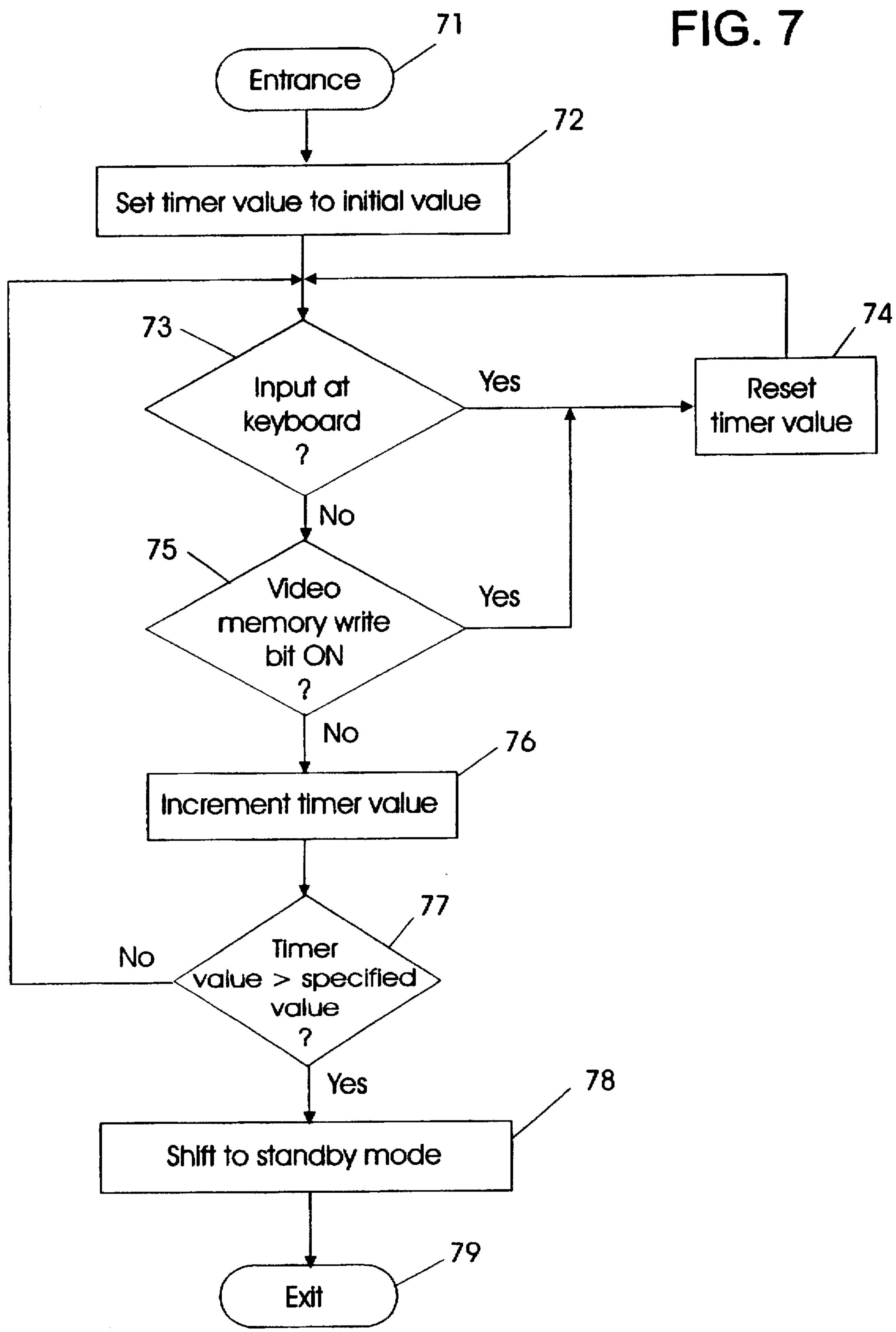
FIG. 7 is a flowchart for a control program of the present invention for controlling a power saving function.

The embodiment of the present invention can be accomplished by the video memory write bit shown in FIG. 6 and by the control provided by using the program shown in FIG. 7.

Although in FIG. 6 the circuit for the present invention is provided by employing discrete components, a similar circuit can be provided by employing ASIC or PAL.

Figure 8:
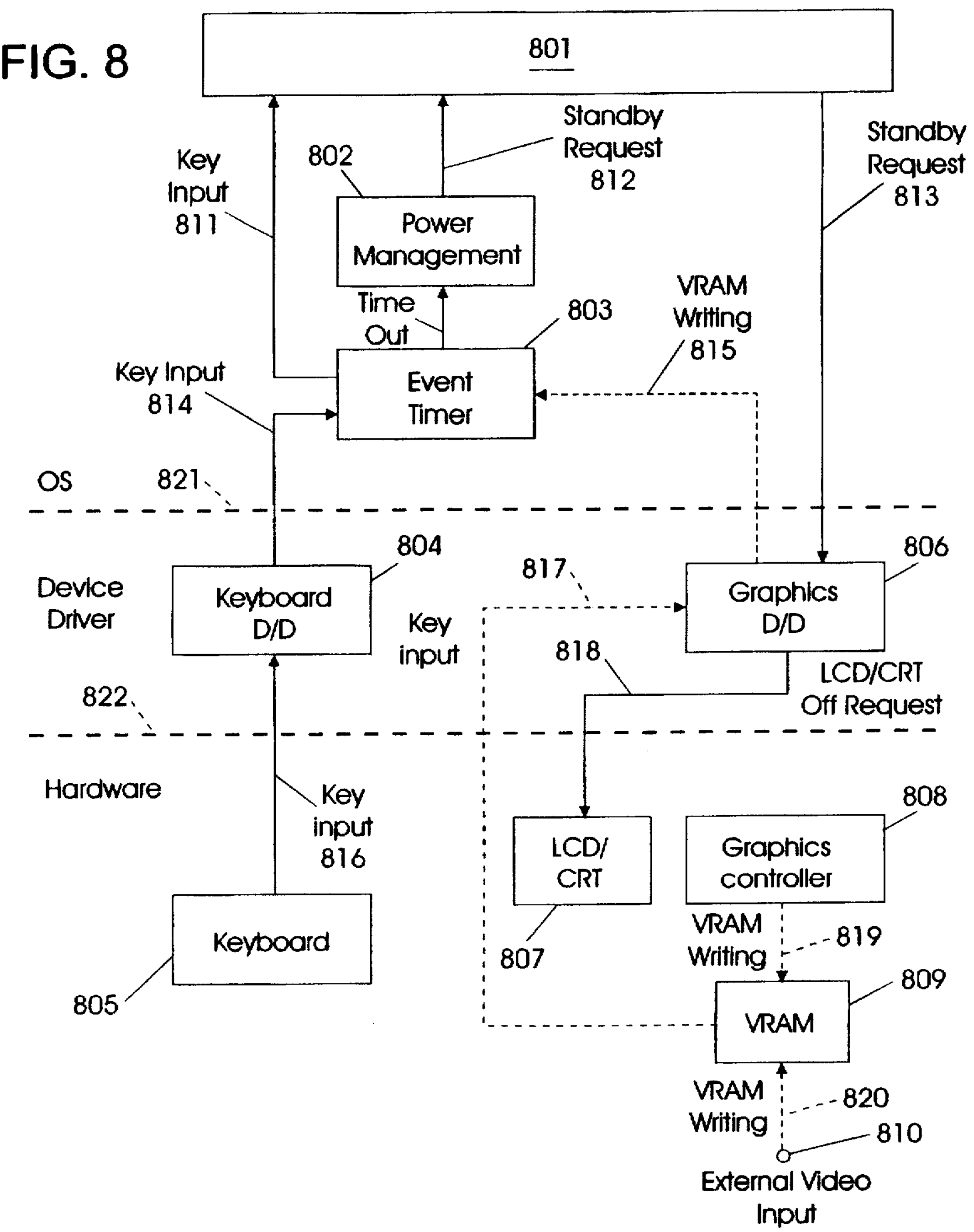
FIG. 8 is a block diagram showing the relationship between components of the present invention and other components of the personal computer.

FIG. 8 is a block diagram showing the relationship between the components of the present invention and the other software and hardware components of a personal computer.

The software of the personal computer can be classified into two functional portions.

The first portion is a portion including what is generally called an operating system (OS) 801, which is located above a broken line 821. The specific examples of this portion are OS/2 and PC DOS from IBM Corp., and Windows from Microsoft Corp. The second portion is a portion called a device driver (D/D), which is located in an area above a broken line 822 and below the broken line 821.

Hardware exists in an area below the broken line 822.

In general, the OS 801 does not access the hardware directly, but indirectly through a device driver and a BIOS. The device driver directly accesses the hardware upon a request from the OS or an application program, and returns the access result from the hardware to the OS, i.e., the device driver serves as a go-between for the OS and the hardware.

The operation of the present invention shown in FIGS. 6 and 7 will now be described while referring to FIG. 8. First, input 816 entered at a keyboard 805 is transmitted to a keyboard D/D 804. Between the OS and the hardware, the keyboard D/D 804 controls the input using a pointing device, such as the keyboard 805 or a mouse. Sequentially, the keyboard D/D 804 transfers the received key input to an event timer 803 (814). The event timer measures the time that elapses from the time input was last entered at the keyboard, etc., to the time of the next input at the keyboard. The time that has elapsed is periodically compared with a predetermined elapsed time (time-out value) set by a user. When the time that has elapsed while there was no input at the keyboard exceeds the predetermined time-out value, a notice of the occurrence of a time-out is transmitted to a power management program 802, which is a program that controls the power saving function for a personal computer. Upon receipt of the notice from the event timer, the power management program 802 issues and transmits a standby request 812 to the OS for shifting the state to the standby state. Upon receipt of the standby request 812 from the power management program 802, the OS 801 transmits a standby request 813 to a graphics D/D 806 that controls the device (e.g., the LCD or the CRT shown in FIG. 4) for which power saving is required in the standby state.

Conventionally, upon receipt of the standby request 813, the graphics D/D 806 transmits an LCD/CRT off request to the LCD or the CRT to render off the LCD or the CRT, as is explained while referring to FIG. 5.

According to the present invention, however, upon receipt of the standby request 813 from the OS 801, the graphics D/D 806 examines the video memory write bit (817) to determine whether or not writing to the video memory (VRAM) 809 was performed. When it is ascertained that memory writing has occurred, the graphics D/D 806 notifies the event timer 803 that VRAM writing was performed (815). The event timer 803, which has obtained information for the VRAM writing, resets the timing value for a set elapsed time (blocks 75 and 74 in FIG. 7).

The writing to the VRAM 809 is normally performed by a graphics controller 808 (819), or externally via an external video input terminal 810 (820).

In the drawings and specifications there has been set forth a preferred embodiment of the invention and, although specific terms are used, the description thus given uses terminology in a generic and descriptive sense only and not for purposes of limitation.

What is claimed is:

1. A computer system comprising:

a screen display memory;

a bit that indicates whether data writing to said screen display memory has been performed; and a power management program executing in the computer system which defines a power saving mode which the computer system enters when there is no predetermined input into the computer system during a predetermined time period;

said power management program responding to said bit indicating that writing to said screen display memory has been performed by inhibiting the computer system from entering said power saving mode regardless of whether there has been no predetermined input into the computer system during said predetermined period.

2. The computer system according to claim 1, wherein said predetermined input is input from a keyboard.

3. The computer system according to claim 1, wherein said predetermined input is input from one of a keyboard and a pointing device.

4. The computer system according to claim 1, wherein power management program disables the displaying of a screen upon entering said power saving mode.

5. The computer system according to claim 1, wherein said power management program disables the displaying of a screen and stops the rotation of a harddrive disk upon entering said power saving mode.

6. The computer system according to claim 1, wherein writing to said screen display memory is enabled from outside said computer system.

7. The computer system according to claim 1, wherein said bit indicating whether writing to said screen display memory has been performed is constituted by a single register bit, and a writing enable (WE) signal to said screen display memory is examined in order to check whether or not said writing is performed.

8. A power management method, for a computer system which has a video memory and a bit indicating whether or not writing to the video memory is performed, comprising the steps of:

determining whether a predetermined input has been performed during a predetermined time period;

responding to a determination that the predetermined input has been absent during the predetermined time interval by determining whether said bit indicates that writing to said video memory has been performed; and responding to a determination that writing to said video memory has not been performed by shifting to a power management mode.

9. A power management method, for a computer system that has a power saving state in addition to a power-on state and a power-off state, comprising the steps of:

determining whether a first event has occurred;

responding to a determination that the first event has not occurred by determining whether a second event has occurred; and responding to a determination that the second event has occurred by shifting said computer system from said power-on state to said power saving state.

* * * * *